United States Patent [19]
Durkin

[11] Patent Number: 5,703,421
[45] Date of Patent: Dec. 30, 1997

[54] RELUCTANCE GENERATOR/MOTOR COOLING

[75] Inventor: Edward B. Durkin, Dayton, Ohio

[73] Assignee: The United States of America as represented by the Secretary of the Air Force, Washington, D.C.

[21] Appl. No.: 653,035

[22] Filed: May 24, 1996

[51] Int. Cl.⁶ .................................................. H02K 9/00
[52] U.S. Cl. ............................ 310/61; 310/52; 310/54; 310/55; 310/58; 310/59; 310/57
[58] Field of Search ........................... 310/52–59, 261, 310/268, 156, 64, 61

[56] References Cited

U.S. PATENT DOCUMENTS

| | | | |
|---|---|---|---|
| 3,529,189 | 9/1970 | Armstrong | 310/59 |
| 3,629,629 | 12/1971 | Liebe | 310/59 |
| 3,652,881 | 3/1972 | Albright et al. | 310/57 |
| 3,997,803 | 12/1976 | Mishra | 310/59 |
| 4,028,569 | 6/1977 | Towne | 310/64 |
| 4,134,317 | 1/1979 | Goel et al. | 83/35 |
| 4,163,163 | 7/1979 | Gurevich | 310/59 |
| 4,182,966 | 1/1980 | Mishra et al. | 310/59 |
| 4,352,034 | 9/1982 | Karhan et al. | 310/59 |
| 4,395,816 | 8/1983 | Pangburn | 29/598 |
| 4,467,229 | 8/1984 | Ogita | 310/60 A |
| 4,469,970 | 9/1984 | Neumann | 310/156 |
| 4,641,051 | 2/1987 | Auinger | 310/61 |
| 5,001,378 | 3/1991 | Miller et al. | 310/178 |
| 5,023,307 | 6/1991 | Horst | 310/156 |
| 5,023,502 | 6/1991 | Johnson | 310/261 |
| 5,053,666 | 10/1991 | Kliman et al. | 310/261 |
| 5,189,325 | 2/1993 | Jarczynski | 310/54 |
| 5,223,757 | 6/1993 | Staub et al. | 310/54 |
| 5,240,069 | 8/1993 | Yerkes | 165/86 |
| 5,283,488 | 2/1994 | Ponnappan | 310/55 |
| 5,369,325 | 11/1994 | Nagate et al. | 310/156 |

*Primary Examiner*—Clayton E. Laballe
*Assistant Examiner*—Elvin G. Enad
*Attorney, Agent, or Firm*—Gerald B. Hollins; Thomas L. Kundert

[57] ABSTRACT

A reluctance motor/generator apparatus capable of operation at high rates of revolu-tion and high energy densities with reduced cooling-related windage losses and without incurring thermal damage to motor/generator elements. The apparatus includes an electrical winding-free reluctance rotor having a plurality of windage controlling and heat dissipating divider or barrier elements (which are also referred-to as thermal elements in the descriptions) disposed at opposite ends and periodically along its axial length to definite a plurality of rotor cooling chamber areas. The divider or barrier elements are provided with cooling fluid limiting apertures selected in size to optimize a relationship between rotor cooling effectiveness and windage energy losses. The machine stator is provided with cooling fluid release apertures of predetermined position and size relationship with the rotor cooling chamber areas. Use of the disclosed apparatus in the aircraft dynamoelectric machine environment is also disclosed.

20 Claims, 3 Drawing Sheets

Fig. 1

RELUCTANCE GENERATOR/MOTOR COOLING

RIGHTS OF THE GOVERNMENT

The invention described herein may be manufactured and used by or for the Government of the United States for all governmental purposes without the payment of any royalty.

BACKGROUND OF THE INVENTION

This invention relates to the field of mechanical energy to electrical energy and electrical energy to mechanical energy conversion apparatus; especially to the salient pole configuration of this apparatus as employed in reluctance dynamo-electric machines such as the reluctance generator, the reluctance alternator and the reluctance motor.

The switched-reluctance electro machine, i.e., the reluctance generator/motor, is considered desirable for use as a direct-drive energy transducer for coupling the rotatable shaft of a turbine engine to either an electrical load or to an electrical energy source. A significant example of this usage appears in the relatively small and lightweight apparatus providing modern aircraft with stand-alone ground electrical energy and air conditioning, for examples, and with in-flight engine restart capability. If such equipment a reluctance generator/motor may be used to both generate electrical energy and provide turbine engine starting torque. Use of such a transducer as the starting motor and alternator coupled to the propulsion engine of the aircraft is also possible.

The arrangement of apparatus for stand-alone ground electrical energy and air conditioning purposes has evolved toward a relatively high speed hot gas turbine which is direct coupled to a reluctance generator/motor, without intervening gear couplings and often employing a common integral driveshaft between turbine and reluctance generator/motor. A part of this evolution has involved equipment called the "More Electrical Aircraft Integrated Power Unit", i.e., the MEA IPU, in the United States Air Force. Apparatus of this type is usually operated at a high revolution rate since considerations involving size and weight are as important as operating life, maintenance requirements and operating noise levels in such equipment. A temperature maintenance arrangement for one portion of this apparatus, the reluctance generator/motor portion, is the subject of the present invention.

As noted, the switched reluctance generator/motor is also found desirable for use as a two-way energy transducer in an aircraft propulsion jet engine; i.e., for use during starting of the engine and then for use in converting a portion of the engine's mechanical energy output into the aircraft's electrical energy source. In the United States Air Force, this embodiment of the switched reluctance generator/motor has been given the name of an "Integral Starter/Generator". In this propulsion jet engine application, a somewhat larger and slower-rotating switched reluctance generator/motor than is optimum for the Aircraft Integrated Power Unit application is needed; nevertheless the energy densities involved in this use are also sufficient to make cooling, as in the present invention, an important consideration in the energy transducer's configuration.

In each of these aircraft uses it is desirable to operate a switched reluctance generator/motor at such energy densities and rates of revolution, rates in the forty thousand to seventy thousand revolutions per minute range for example, that energy losses within the machine's enclosure can result in harmful temperature increases in machine components. Notwithstanding common use of cobalt steels and the thinnest laminations practical for example, it is possible for the operating temperature of the rotor in a reluctance motor/generator of such equipment to approach operating temperatures of one thousand degrees Fahrenheit.

At this temperature the metallurgical and magnetic properties of the rotor material are often adversely affected. In equipment operating at this temperature it is for example, desirable to avoid stress concentrations or stress risers, which may result from the use of rotor attachments employing keyways, threaded members or other stress concentrating attachments which could otherwise be desirable for fabrication or cooling purposes. In the winding-free rotor arrangement of a reluctance motor/generator, energy losses causing these temperatures arise not from copper or $I^2R$ sources, but from hysteresis and eddy current losses in the magnetic material and also from windage losses attending the rotor at high rates of revolution.

Although the space, weight, energy density and temperature considerations which make the switched reluctance motor/generator desirable in aircraft applications are not so demanding in most ground based equipment, the cooling arrangements of the present invention may be extended to such equipment and indeed may find utility in devices other than the switched reluctance motor/generator—in other forms of rotating electromagnetic machines for example. The salient pole structure and the presence of relatively large interpole spaces in the reluctance motor/generator make this machine particularly amenable to the cooling of the present invention however.

As may be better appreciated from consideration of several patents identified in the following paragraphs of this document, a plurality of cooling arrangements have been employed with reluctance and other motor/generator apparatus. Some cooling arrangements involve the use of flowing liquids traversing parts of the machine while others include the biphase fluid heat exchanger device which is otherwise known as a heat pipe. Although such heat pipes are small in size and perform satisfactorily in certain cooling environments, they are not without disadvantage in the present environment since they involve a volatile substance, often a liquid; a sealed containment structure and some shape, dimensional and configuration restrictions. These and additional aspects of a heat pipe have led to hesitancy toward its use in apparatus of the reluctance motor/generator type, particularly in military equipment. The heat pipe is also somewhat difficult to manage in the rotating element of a dynamoelectric machine for reasons involving fluid mobility and dynamic balance considerations—as is also apparent from some of the inventions described below. In any event, there appears to be a need in the art for a simple and more effective cooling arrangement for the rotating member of a high energy density electromagnetic machine such as the switched reluctance motor/generator.

Work by others relating to the cooling of a reluctance motor/generator and similar equipment includes the invention of K. L. Yerkes in U.S. Pat. No. 5,240,069, a patent also assigned to the United States Air Force. The Yerkes invention involves a thermosiphon apparatus used in the rotor of a jet engine integral starter/generator. The thrust of the Yerkes invention appears to be in the area of maintaining dynamic balance and cooling capability in a rotating element. The significantly different structure and absence of a thermosiphon are believed to distinguish the present invention from the Yerkes patent. Similarly, the U.S. Pat. No. 5,283,488 of R. Ponnappan et al., another patent assigned to the United States Air Force, also concerns a rotating machine cooling arrangement which involves a heat pipe element.

The U.S. Patent art also discloses a number of inventions relating to the control of cooling fluid flow within a dynamoelectric machine, machines of both the reluctance motor/generator and the more frequently encountered wound rotor types. Included in this group are U.S. Pat. No. 3,529,189 of F. J. Armstrong, a patent in which a series of radially disposed baffle members are located along the stator of the dynamoelectric machine in order to direct a gaseous cooling fluid into better contact with parts of the machine. The non rotating (i.e., stator) location of the Armstrong baffles appears however, to make this disclosure of limited interest with respect to the present invention.

Also included in these patents is U.S. Pat. No. 4,134,317 of R. P. Goel et al., the related U.S. Pat. No. 4,182,966 of A. K. Mishra et al., and U.S. Pat. No. 4,028,569 of R. P. Towne, three related patents which provide for the radial flow of cooling gases through the laminated stator of a dynamoelectric machine. In the Goel-Mishra-Towne apparatus an array of ventilating fingers are used to guide this radial flow of cooling gas across the surface of vent plate members which are disposed between laminations of the stator stack. The Goel-Mishra-Towne vent plate members are also provided with an array of bow tie-shaped slot openings having particular orientations which are used to attach the ventilating fingers to the vent plates. Radial coolant flow in vent channels of a stator is also disclosed in the U.S. Pat. No. 4,163,163 of E. I. Gurevich. Applicants' concerns with rotor cooling, rotor structure, axial coolant flow, and related differences are submitted to distinguish over disclosure present in these patents.

The U.S. Pat. No. 3,629,629 of Wolfgang Liebe discloses a rotor cooling arrangement which is also of general interest with respect to the present invention; an arrangement in which a series of radially disposed deflector elements are located along the length of a machine rotor in the annular space between adjacent rotor poles in order to control the axial flow of cooling fluid along the rotor length. The Liebe deflectors are made of nonmagnetic material, abut the adjacent rotor pole windings, are attached by bolts and dovetail arrangements to the rotor itself and are disclosed to be of about one-half the radial height of the adjacent rotor poles. Applicants' use of axial flow controlling apertures in the rotor cooling elements, differing cooling element attachment arrangements, differing rotor cooling element height, a non wound rotor machine, and related arrangements are submitted to distinguish over the Liebe disclosure.

The U.S. Pat. No. 4,467,229 of Tadahisa Ogita discloses a rotor cooling arrangement which is also of general interest with respect to the present invention, an arrangement in which a series of apertured, radially disposed, axially extending tee-shaped vent plates 40 are located along the length of a machine rotor, in the annular space between adjacent rotor poles, in order to control the radial flow of cooling fluid from the rotor. Applicants' invention is believed distinguished over the Ogita disclosure by its different arrangement of the rotor cooling elements.

The U.S. Pat. No. 5,001,378 of W. H. Miller et al. also discloses a cooling arrangement which is of general interest with respect to the present invention, an arrangement in which a series of radially disposed disc-like "shroud elements" 29 and 31 are located adjacent salient rotor poles at opposed ends of a homopolar machine rotor. These disc-like shroud elements 29 and 31 control or block axial air flow into the rotor-stator space of the machine, control rotor windage losses and eliminate the need for thrust bearings for maintaining the rotor axially centered. The Miller et al. shroud elements are made of magnetic material, C5, L46, in order to magnetically achieve this thrust bearing-free axial centering function. Applicants' use of a differing dynamoelectric machine, use of plural radial elements spaced along the rotor, use of nonmagnetic materials in the rotor cooling elements, provision of coolant regulating apertures in the rotor cooling elements and related concepts are believed distinguishing.

The U.S. Pat. No. 5,053,666 of G. B. Kliman et al. discloses a reluctance machine which may be used in aircraft engine starting and which also has certain structural features of general interest with respect to the present invention. The overall thrust of the Kliman et al. machine is concerned with a rotor having interpole spaces filled with nonmagnetic materials. One arrangement of these interpole spaces includes a cage assembly into which the rotor laminations are stacked at fabrication. This cage assembly may be constructed of nonmagnetic materials using welding, and as shown in FIG. 6, may include end plate members and radially disposed support laminations to strengthen the cage assembly. Although the end plate members and nonmagnetic support laminations of this FIG. 6 cage assembly have certain structural similarities to elements of applicants' invention, the functional differences, dimensional differences and additional elements in the Kliman structure are believed to limit its overall similarity to applicants' invention.

The U.S. Pat. No. 3,997,803 of A. K. Mishra discloses a rotor cooling arrangement which is also of general interest with respect to the present invention, an arrangement in which a series of radially disposed rotor cooling ducts 18 are fed with cooling fluid from axially extending passages 30 within the rotor. The Mishra rotor passages 30 are of decreasing cross sectional area along the rotor length in order to control cooling fluid flow from the radially disposed rotor ducts 18. Applicants' invention is believed distinguished over the Mishra disclosure by its substantially different arrangement of the rotor cooling elements.

SUMMARY OF THE INVENTION

The present invention provides a rotor cooling disc-inclusive arrangement for cooling the rotor and other components of a reluctance motor/generator dynamoelectric machine using air or some other viscous fluid and while also controlling the losses such a machine incurs from coolant related windage effects.

It is an object of the present invention therefore, to provide an efficient reluctance motor/generator arrangement.

It is also an object of the present invention to provide a dynamoelectric machine in which a desirable balance between windage energy losses and cooling effectiveness is achieved.

It is another object of the invention to provide a switched reluctance motor/generator arrangement in which more effective rotor cooling is achieved.

It is another object of the invention to provide a switched reluctance motor/generator in which heat is extracted from interior portions of the rotor structure in an effective manner.

It is another object of the invention to provide a reluctance motor/generator dynamoelectric machine in which the operating temperature profile of the rotor structure can be precisely controlled by selecting locations for rotor temperature determining members during fabrication.

It is another object of the invention to provide a reluctance motor/generator structure in which rotor temperature determining members function in multiple modes of operation.

It is another object of the invention to provide a reluctance motor/generator structure in which rotor temperature determining members function to extract thermal energy from rotor interior regions, to control cooling fluid flow quantities, and to control cooling fluid distribution along the rotor's length.

Additional objects and features of the invention will be understood from the following description and claims and the accompanying drawings.

These and other objects of the invention are achieved by a switched reluctance motor/generator apparatus comprising the combination of:

a motor/generator torque-communicating rotatable shaft member disposed along a central axis of a motor/generator stator member;

a salient pole magnetically conductive rotor member extending lengthwise along said torque-communicating rotatable shaft member within said stator member and connecting with said rotatable shaft member in a rotor centrodial region;

said rotor member having a first substantially circular periphery of a first diameter around an outer extremity of said salient poles and a second periphery of a second smaller diameter in annular segment interpole regions located intermediate root portions of said salient poles;

said rotor member being comprised of a plurality of electromagnetic loss-minimizing thin rotor lamination members held in captive adjacency along said rotatable shaft member;

said rotor member including a plurality of rotor temperature-controlling thermal elements of substantially said first diameter circular configuration and selected thickness disposed at opposed rotor ends and intermediate adjacent rotor laminations at selected axial space intervals along said rotor and said rotatable shaft member;

said intermediate rotor temperature-controlling thermal elements having exposed annular segment interpole regions located intermediate said rotor salient poles;

said rotor temperature-controlling thermal elements also having coolant fluid axial flow-communicating apertures of selected cross-sectional area disposed in said exposed annular segment interpole regions thereof; and a plurality of coolant fluid escape apertures disposed along said stator member at axially selected locations intermediate said rotor temperature-controlling thermal elements.

DETAILED DESCRIPTION

Certain dynamoelectric machines of the switched reluctance motor/generator type are desirably operated at what may be considered to be higher energy densities, densities possible in part because of being used at unusually high rates of revolution. The rotor illustrated in FIG. 2a and FIG. 2b in the drawings, for example, in everyday household equipment is comparable in size to that of a five-hundred watt vacuum cleaner or three-hundred watt food mixer motor. In uses contemplated for the present invention apparatus, revolution rates of four to six-thousand per minute as employed in these household uses are replaced with rates of up to one hundred thousand per minute and operation with sixty hertz single phase energy is replaced with higher frequencies and multiple phases. Under such conditions the FIG. 2a and FIG. 2b rotor is capable of operation at energy levels in the two hundred thousand watt or two hundred kilowatt range.

Figure 2A:
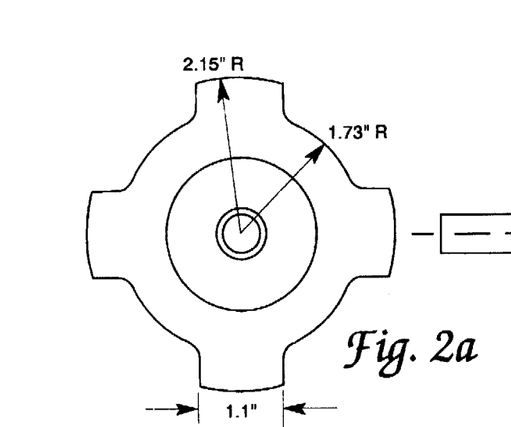
FIG. 2a shows an end view of a rotor for a machine of the FIG. 1 type absent certain elements relating to the present invention.
Figure 2B:
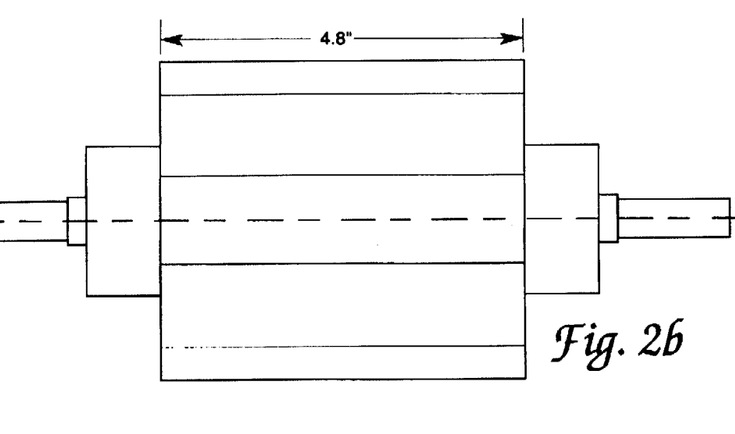
FIG. 2b shows a side view of a rotor for a machine of the FIG. 1 type also absent certain elements relating to the present invention.

The FIG. 2 rotor is in fact representative of the size which may be used in an aircraft auxiliary power unit employing a hot gas turbine prime mover, an apparatus capable of generating some one-hundred to two-hundred kilowatts of electrical energy for engine starting and ground use when arranged according to the present invention. Machines of similar size may also be used in the starting and electrical energy generation functions of an aircraft propulsion engine. As a starter motor such machines are usually rated for a power level of one-hundred-fifty to three-hundred kilowatts. For propulsion engine starting and electrical energy generation however, a somewhat larger in physical size machine which operates in the slower speed range of fifteen-thousand to twenty-five-thousand revolutions per minute is currently preferred.

When operated at these energy levels, a machine of the FIG. 2 size is subjected to significant electromagnetic losses, primarily from hysteresis and eddy current effects. [During operation at these energy levels and revolution rates it may be appreciated that the presence of electrical windings effects on a rotor of the FIG. 2a and FIG. 2b type would pose a significant additional thermal loss mechanism, as well as a difficult winding restraint (against centrifugal force) problem; hence a preference for the reluctance dynamoelectric machine in such environments.] These electromagnetic losses alone can easily result in temperatures beyond the tolerance capability of the magnetic materials and other materials comprising active elements of the machine, temperatures in excess of one thousand degrees Fahrenheit for example. An elevated temperature environment as is associated with a hot gas prime mover is of further difficulty in this temperature environment, particularly when the desired common integral shaft is used for the turbine and the rotor of the energy transducer machine.

Parenthetically it is perhaps helpful to explain that the several terms "energy transducer", "dynamoelectric machine", "reluctance motor/generator" and "switched reluctance motor/generator" are used somewhat interchangeably and in various combinations in referring to machines of either motor or generator capability in the present patent document. Similarly the terms "rotor temperature-controlling thermal elements", "radially extending fluid flow barrier elements", and "circular disc"

are used in referring to a generally common element in this discussion. The present disclosure is also couched primarily in terms of a reluctance machine, a machine which has no rotor windings even of the squirrel cage type and also no brushes. Although the freedom from winding encumbrance in the interpole space between salient poles of a reluctance machine is a significant aspect in the selection of this machine for presently described uses and is enabling of the presently disclosed arrangement of a reluctance motor/ generator cooling arrangement, the invention is not limited to this type of machine and may find utility in a number of different other dynamoelectric machine types.

Returning then to the FIG. 2 drawing, at the indicated operating speeds energy losses from windage effects within a dynamoelectric machine can be also be significant, from both an efficiency standpoint and for their additional adverse effect on machine operating temperature. The FIG. 2 illustrated rotor when operated at fifty-five thousand revolutions per minute in atmospheric pressure with a twenty thousandths of an inch rotor-to-stator air gap for example, is found to incur a windage loss of some 7.6 kilowatts. Operation at a higher revolution rates and with full load magnetic losses imposed would of course sharply increase this loss and thus the energy to be dissipated in order to limit machine temperature rise.

Figure 4A:
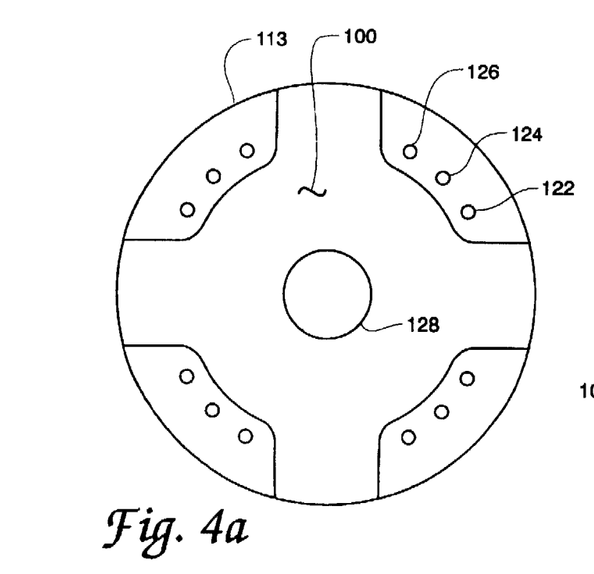
FIG. 4a shows an end view of a rotor for a machine of the FIG. 1 type including elements relating to the present invention.
Figure 4B:
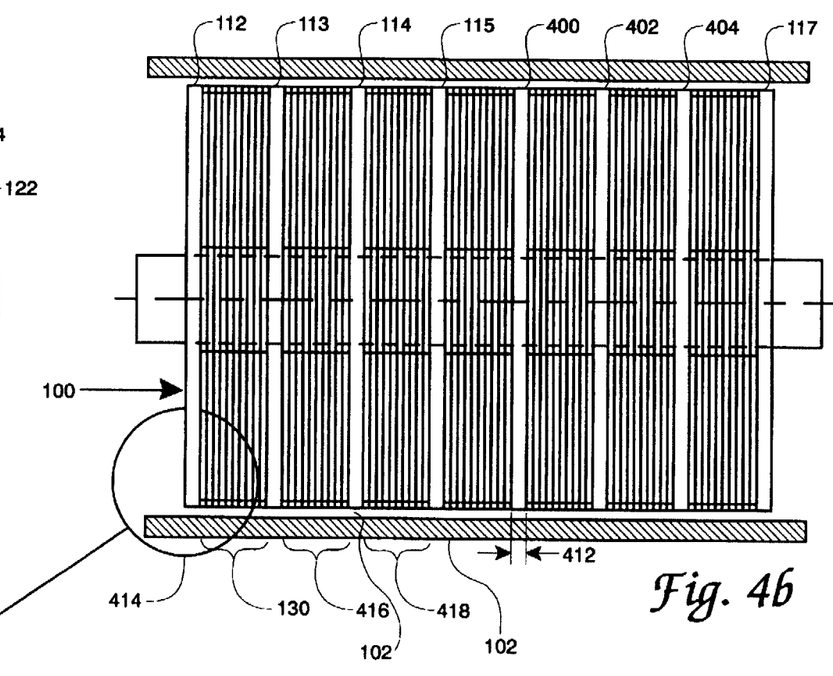
FIG. 4b shows an side view of a rotor for a machine of the FIG. 1 type including elements relating to the present invention.
Figure 4C:
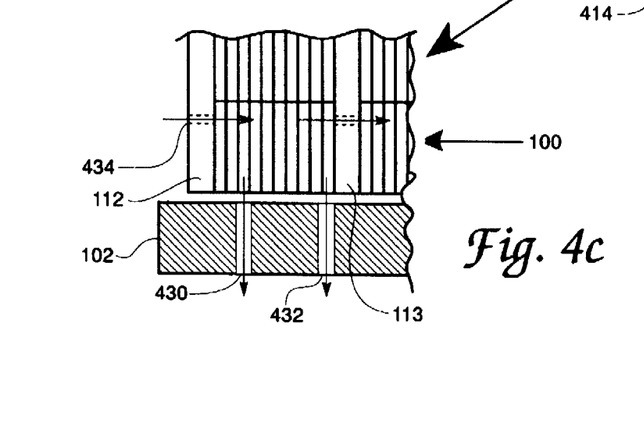
FIG. 4c shows an enlarged partial view of rotor and stator portions of the FIG. 4b machine.

One or more of the cooling arrangements identified in the above Background of the Invention section may of course be used to dissipate these energy losses and maintain safe machine operating temperatures. The present invention, as is summarily disclosed in the drawing figures herein and particularly in FIGS. 1 and 4, provides a way for limiting the windage-related component of this loss while maintaining or improving the removal of heat from the machine, particularly from its rotor where thermal effects are especially significant.

Figure 1:
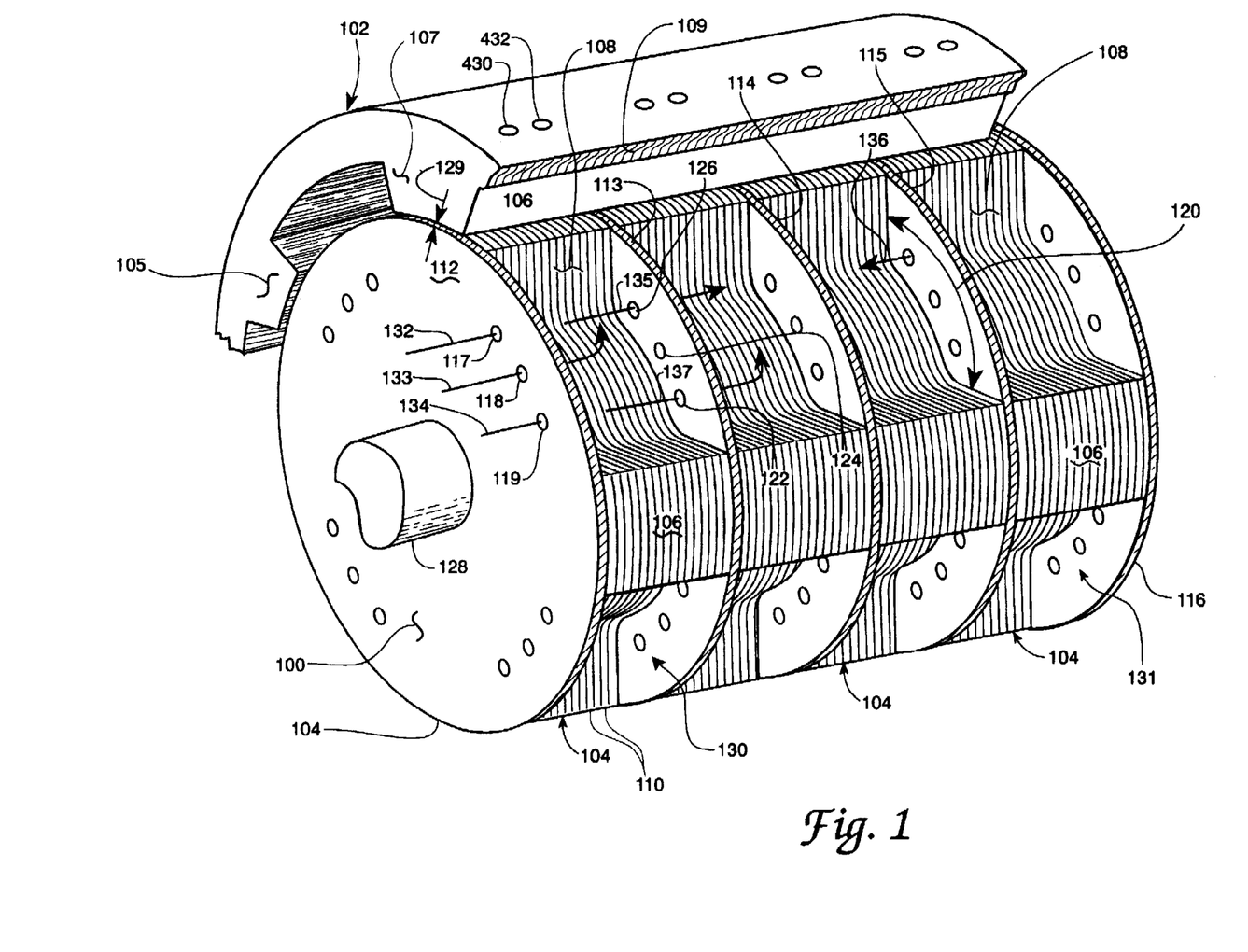
FIG. 1 shows a cutaway overall perspective view of a dynamoelectric machine according to the invention.

FIG. 1 in the drawings therefore shows a cutaway perspective view of a reluctance motor/generator machine which includes elements relating to the present invention. In the FIG. 1 drawing there is represented a rotor 100 which includes a plurality of salient poles 104, 106 and 108. The rotor 100 is carried on an axially extending shaft 128 and is comprised of numerous thin laminations which are indicated at 110. The laminations 110 are held in fixed relative position to form the rotor 100 by being pressed onto the shaft 128 or by other means known in the art, means which are not shown in FIG. 1.

The FIG. 1 reluctance motor/generator also includes a stator member 102 which completely surrounds the rotor 100 and which also has a number of attached or integral salient poles 105 and 107; the stator 102 is shown in a cutaway representation in FIG. 1 in the interest of more clearly showing other motor structure. The stator 102 is preferably also composed of stacked laminations as indicated at 109 in its cutaway portion at the top of FIG. 1. Windings which are also present on the stator 102 are not shown in FIG. 1 for the sake of additional clarity, but are however, represented in simple form at 300 in the FIG. 3 drawing. Each of the FIG. 1 rotor 100 and stator 102 includes magnetic circuit portions which interconnect the poles and provide the cross sectional area to conduct magnetic flux needed for reluctance motor/generator operation. An airgap 129 separates poles of the rotor 100 and stator 102 in order to provide rotational clearance for the rotor 100; this air gap is of some tens of thousandths of an inch in length in an actual reluctance motor/generator but is represented to be of non specific length in FIG. 1 for drawing convenience.

Also shown in the FIG. 1 drawing are a series of rotor temperature-controlling circular disc thermal conductor elements which are represented at 112, 113, 114, 115 and 116; these elements divide the rotor length into a plurality of rotor cylindrical segments. These elements are also referred to as radially extending fluid flow barrier elements and rotor temperature controlling thermal elements in this document in recognition of the multiple functions they perform in the invention. In the interest of brevity however these elements are often referred to simply as "thermal elements" and possibly by related other names in the present document. As shown at 117, 118 and 119 for the thermal element 112 and at 122, 124 and 126 for the thermal element 113, these thermal elements are provided with a plurality of cooling fluid-communicating apertures which admit air or other heat removing viscous fluid to the rotor interpole chambers or cooling chambers represented typically at 130 and 131 in FIG. 1. Arrows indicating various typical flow paths for this fluid are shown at 132, 133, 134, 135, 136 and 137 in FIG. 1. Additional details regarding thermal elements 112 and 114 are disclosed by way of the other drawings herein and in subsequent parts of this specification.

Figure 3:
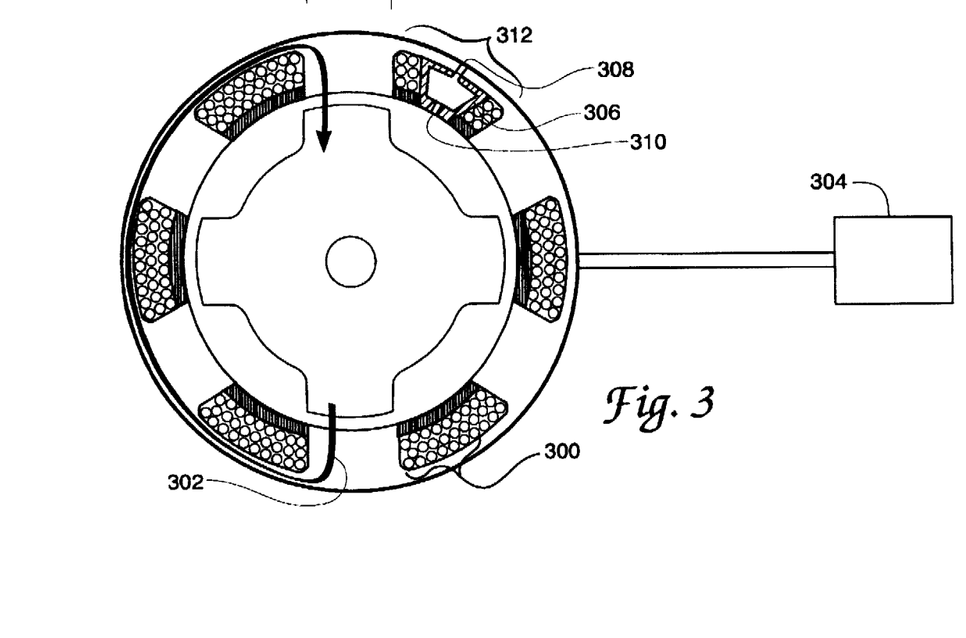
FIG. 3 shows a typical pole and winding arrangement for a machine of the FIG. 1 type.

FIG. 3 in the drawings shows additional details of the FIG. 1 and FIG. 2 reluctance motor/generator. In this FIG. 3 end view a four-pole rotor and six-pole stator configuration of the machine appear, along with one relationship of these rotor and stator poles at an instant near pole commutation in the machine operating cycle. Arrangements for achieving this pole commutation, preferably through the use of solid state electronic switching devices controlled by rotor position sensing apparatus, are known in the art and are therefore represented by the block indicated at 304 in FIG. 3 but not additionally discussed here. When combined with excitation involving such switching circuitry, the reluctance motor/ generator is often referred to using the name "switched reluctance motor/generator". Switching excitation is of course appropriate when the machine is used as a motor and is also used in connection with the machine functioning as a generator or alternator.

One possible magnetic circuit used during operation of the FIG. 3 machine is indicated at 302. As is known in the art, the FIG. 3 machine accomplishes its energy transfer or energy transducer function by way of changing magnetic reluctance in this typical magnetic circuit 302. This change results from increasing or decreasing rotor-to-stator pole alignment, and a resulting change in magnetic flux quantity existing in the magnetic circuit 302. A tendency to maximize this flux and minimize the reluctance of the magnetic circuit 302 generates a physical attraction between rotor and stator poles of the machine and thereby causes its motor action; a change of flux quantity in the magnetic circuit 302 induces electromotive force or voltage into the windings 300 and thereby causes generator action. It is of course this variation of flux in elements of the magnetic circuit 302 which also provides one of the primary sources of energy loss and heating in the FIG. 3 machine—in either its generator or motor operating mode. Such changes lead to hysteresis and eddy current electromagnetic effects which are of an energy dissipating nature.

Figure 3A:
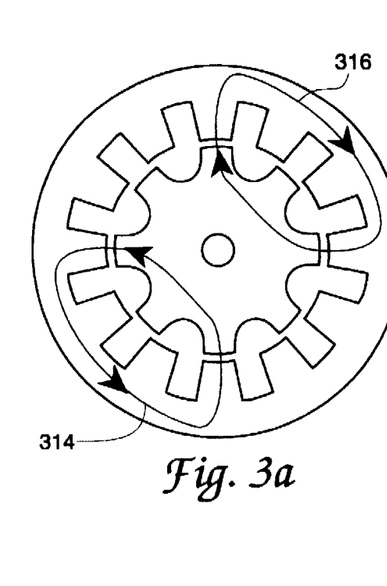
FIG. 3a shows another pole arrangement for a machine of the FIG. 1 type.

The FIG. 3 drawing also shows a representative arrangement of the electrical windings 300 used to communicate electrical energy between an external source or load and the reluctance motor/generator machine. The number of winding turns and the cross-sectional area of each turn in the group 300 is of course determinative of the machine voltage, current and impedance operating levels. Such windings are usually present at each of the stator poles and may fill all of the stator interpole space of the machine as shown for the windings 300. Often however, it is not necessary to use the entire interpole space for windings, particularly in the instance of a six or fewer poled stator. In such instances there is available sufficient interpole area for a spacer 306, which appears in the windings 312, together with additional winding-located cooling fluid paths which are discussed below An eight pole rotor and twelve pole stator switched reluctance motor/generator is represented in the FIG. 3a drawing. Two of the somewhat shorter stator flux paths for this arrangement of a switched reluctance motor/generator are shown at 314 and 316. This pole arrangement is also convenient for use in the present invention but does however, present less winding region cross-sectional area for the winding spacer 306 of FIG. 3 and winding-located cooling fluid paths. In small diametered machines the available interpole space may therefore be undesirably limited in the FIG. 3a machine.

FIG. 4 in the drawings shows by way of the three views of FIG. 4a, FIG. 4b and FIG. 4c additional details of another rotor for a reluctance motor/generator according to the present invention. In FIG. 4a an end view of this rotor is represented to have the most adjacent or endmost thermal element (112 in FIG. 1) removed in order that the rotor poles and the next adjacent thermal element (e.g. the element 113 of FIG. 1) be clearly visible. The shaft 128 of FIG. 1 also appears in this FIG. 4a view, as do the cooling fluid communicating apertures 122, 124 and 126. Additional of the thermal elements 114 as are desirable in some machines according to the invention appear at 400, 402, and 404 in the FIG. 4b view of the reluctance motor/generator rotor.

The thermal elements 112, 113, 114, 115, 116, 400, 402 and 404 (herein afterward collectively referred to as the thermal elements 112–116) are preferably fabricated from a metal of high heat conductivity, a nonmagnetic metal which also has sufficient mechanical strength to withstand the centrifugal forces present when the rotor 100 is operated at revolution rates approaching one hundred thousand (100,000) per minute. Metal such as beryllium, certain forms of copper, aluminum, possibly titanium and also alloys of these metals including bronze, brass and high-strength aluminum alloys are believed best candidates for use in the discs 112–116. Ferrous and other magnetic materials are excluded from this list in view of magnetic shunting, energy loss and other undesirable effects a magnetic element would present in the rotor flux paths of the machine.

Since the non-magnetic thermal elements 112–116 are disposed in locations along or parallel to the primary direction of magnetic flux flow and flux change in the FIG. 4 machine there is a minimal degree of eddy current heating effect or magnetic energy loss in these thermal elements and their ability to efficiently extract heat from the rotor interior and the adjacent laminations of the rotor without contributing to machine losses is not compromised. For a similar loss-related reason, i.e., the minimization of windage losses in the machine, both the lateral and circumferential surfaces of the thermal elements 112–116 are preferably made to be as smooth and planar as possible. In this regard note that at least interpole annular portions of each of the internal thermal elements 113, 114 and 115 is also exposed to coolant fluid and that these annular portions, indicated at 120 in FIG. 1, can therefore add to machine windage losses.

In order to achieve the heat conduction function and also to provide the needed mechanical strength for the thermal elements 112–116 it is desirable that their thickness, 412 in FIG. 4b, be about fifteen thousandths (0.015) of an inch; actually a range of thickness between eight thousandths (0.008) of an inch and two hundred thousandths (0.008–0.20) of an inch is believed acceptable for various arrangements of these thermal elements. Although cooling fluid flow along the flow paths 132, 134, and 136 in FIG. 1 is inversely affected by increasing thickness of the discs 112–116, a selection of cross-sectional area for the apertures 117, 118 and 119 may be used to obtain desirable cooling fluid flow rates. Additional aspects concerning cooling fluid flow patterns and operating temperature, especially in the rotor 100 are discussed below.

In addition to the already disclosed function of the thermal elements 112–116 in conducting heat from the interior of the rotor 100, these elements also accomplish significant additional functions in the present invention. One of these additional functions is concerned with limiting cooling fluid flow into the rotor/stator pole space region of the reluctance motor/generator i.e., into the interpole chambers 130 and 131 and into the rotor-to-stator airgap regions in FIG. 1. This cooling fluid flow limitation is of course accomplished in order to limit windage losses attending high speed rotation of the rotor 100. Indeed as indicated above in the objects of the invention discussion, this control of windage losses or achieving a controlled tradeoff between windage loss and desired rotor cooling is a significant aspect of the invention.

As an example of the quantitative benefits achievable with the improvements disclosed herein, the above recited 7.6 kilowatts of windage loss for a fifty-five thousand revolutions per minute machine may be considered. Closing off the rotor ends in a reluctance motor/generator using an array of non-rotating "shrouds" has been demonstrated to reduce overall windage loss by 50% for a 4-pole rotor of, for example, the FIG. 3 configuration. Adding rotating circular disc baffles e.g., the endmost of the thermal elements 112–116, to the rotor ends as disclosed herein accomplishes a similar shrouding effect without adding a large loss mechanism of its own so that a loss reduction in the 3 to 4 kilowatt range is possible in the parameters of this example.

FIG. 4c of the drawings shows an enlarged view of the FIG. 4b rotor portion indicated at 414. The FIG. 4c view of a rotor portion is oriented exactly as in the FIG. 4b view, i.e., the rotor shaft lies in the upward direction in FIG. 4c just as in FIG. 4b. In this FIG. 4c view the disposition of spent cooling fluid escape apertures in the reluctance motor/generator stator 102 is represented at 430 and 432; entry path-related elements for this cooling fluid are also indicated by the aperture 434 in FIG. 4c. The escape apertures 430 and 432 also appear near the top in the perspective view of the FIG. 1 drawing. As shown in FIG. 1 these apertures are located in the stator pole structure regions of the reluctance motor/generator; in the FIG. 4 drawing these apertures are shown in a more generic form which is intended to indicate such apertures may be disposed in a variety of locations on the stator. The FIG. 1 stator pole location of these apertures is however, convenient in many instances since this location provides for a selectable quantity of stator pole lamination cooling and since the space between stator poles of the reluctance motor/generator may be largely filled with electrical windings for the machine.

The electrical windings of the reluctance motor/generator may often be arranged to have the spacers shown at 306 and the cooling fluid escape apertures 308 and 310 located in the stator interpole spaces of the machine. Such winding spacers and stator/machine housing apertures located in communication therewith of course provide for winding cooling in addition to spent cooling fluid venting from the rotor-stator area. The spent cooling fluid vented from such winding-located apertures is of course somewhat limited as to its incurred rotor cooling-induced upper temperature limit in order to not exceed the temperature tolerance of organic insulating materials usually employed in electrical winding assemblies. Winding-located stator cooling fluid escape apertures are also advantageous in instances wherein the full stator pole area is needed for magnetic flux conduction purposes.

As may be apparent upon reflective consideration of the FIG. 4 and FIG. 1 views of the present invention reluctance motor/generator, the endmost of the cooling chambers or interpole chambers 130, 131 etc. of the machine could easily be somewhat favored as to having the largest supply of coolant fluid and the lowest temperature source of this cooling fluid. This condition arises because all of the coolant fluid expended up to the axial or lengthwise center of the rotor in effect traverses these first cooling chambers 130, 131 etc. at each end of the rotor and since coolant fluid entering these chambers is the coolest of the fluid available to the rotor. In addition the quantity of cooling fluid entering each axially successive group of cooling chambers and moving toward a centermost group of chambers is decreased in quantity by the amount of cooling fluid allowed to escape through the housing apertures 430 and 432. This latter factor is perhaps more significant in a machine of the FIG. 4 type wherein a greater number of axially serial cooling chambers is used than in the FIG. 1 machine. This favoring of the endmost cooling chambers and their portion of the rotor is moreover enhanced by the fact that coolant fluid traveling along the extended flow path 132–135 in FIG. 1 is warmed in each successive cooling chamber after the chamber 130, i.e., in each of the subsequent cavities indicated at 416 and 418 in FIG. 4b for example.

As a result of both this successive warming and the more limited flow of cooling fluid to axially central portions of the present invention reluctance motor/generator both the rotor 100 and the stator 102 tend to operate with a temperature profile having the highest temperatures near axially or lengthwise central regions of the machine. The relatively large mating surface areas of adjacent stator laminations and adjacent rotor laminations and the relatively good thermal conductivity properties of even the steel and cobalt alloys used in these laminations of course minimizes this temperature profile effect, and tends to keep axially segregated portions of the machine at the same temperature. The desired conduction of heat across axially-oriented or thickness dimension directions of the thermal elements 113, 114, and 115 for example, is another reason for the desired use of high thermal conductivity materials in these discs.

This increase in the axial center temperature profile effect can also be minimized by intentionally operating the endmost cavities of the machine at warmer than inherent temperatures i.e., by controlling the size of the stator apertures 430 and 432 in each successive cavity in a manner providing the greatest fluid release from stator at axially central portions of the machine. Indeed such control of temperatures or the temperature profile along the axial length of rotor 100 is another significant aspect of the present invention. Notwithstanding this and other possible temperature control mechanisms, it is nevertheless desirable in configuring a machine according to the invention to consider a worst case philosophy in which greatest temperatures experienced, most likely at the machine center, are controlling of fluid flow and release quantities and machine materials composition.

Although the release of cooling fluid at successive apertures 430 and 432 suggests the rotor cooling fluid communicating apertures 122 of an endmost thermal element 112 should be larger than such apertures in successive discs 113, 114, 115 etc., the greatest fluid release at axially central portions of the machine concept tends to offset this arrangement and make the location of largest apertures in both thermal element 112 and stator 102 a matter of individual machine tailoring. The effects of machine loading, duty cycle and related factors must also be considered in this tailoring.

The addition of circular disc thermal elements within the rotor laminate stack is therefore a significant aspect of the present invention. These discs may be viewed as performing several possibly related but yet distinct functions as follows.

1) Increasing the effective heat transfer surface area of the rotor without a complex change to the rotor structure.

2) Conducting heat from the radial and axial interior regions of the rotor to an external region where it can be dissipated.

3) Reducing the quantity of air or other cooling fluid available for rotor engagement and turbulence heating—especially at axially central portions of the machine.

4) Enabling a more precise tradeoff between windage losses and cooling effectiveness in the machine.

5) Allowing temperature profile control in both rotor and stator portions of the machine.

6) Increasing the kinetic mass and kinetic energy storage ability of the rotor.

7) Increasing the thermal mass of the machine rotor—to allow for more severe short term overloading, for example.

8) Increasing reluctance motor/generator tolerance of the hot input shaft condition—as in a power unit of decreased physical size.

9) Reducing coolant mixing and turbulence within the enclosed pole gap region of the machine, i.e. enabling a more precisely controlled fluid flow circuit and distinct input to output flow of coolant.

The increase of machine thermal mass by way of the present invention is particularly desirable in the case of machines operated with a low ratio of ON/OFF duty cycle time, in such operation, machine thermal mass allows heavy brief overloading (as was noted by inventor C. F. Kettering in connection with the first automobile electric starter). Addition of the thermal element discs can therefore accomplish the goal of preventing an overheat temperature from being reached within the machine by way of several operative mechanisms.

In summation therefore, a switched reluctance motor/generator can incur a windage drag loss which increases exponentially with rotor speed. At speeds of 30–60 krpm, the heat generated from such windage loss can be sufficient to reduce the operating life of the machine. With the switched reluctance motor/generator rotor normally being made from a stack of laminations confined on a rotating shaft, the present invention concerns the insertion of full circular disc thermal elements at selected intervals within the lamination stack is convenient and beneficial. These thermal elements are of a material having selected heat capacity, strength and thermal conductivity. Inserting these thermal elements at the rotor ends and within the lamination stack also reduces the overall windage loss and increases the rotor heat transfer capability through a number of operating mechanisms.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. A reduced coolant windage loss salient pole high speed reluctance dynamoelectric machine comprising the combination of:
   a tubular shaped salient-poled stator member having a plurality of internal stator poles and stator pole-carried electrical windings;
   a salient pole stacked lamination cylindrical rotor member received centrally within said stator member, extending along a stator central axis and rotatable about said central axis;
   a plurality of axially spaced circular disc thermal conductor members disposed one at each end of said rotor member and intermediate selected laminations of said rotor member anti segregating said rotor member into axially adjacent cylindrical segments each including a plurality of rotor periphery-facing cooling chambers disposed angularly intermediate said rotor salient poles;
   axial coolant flow enabling and flow-controlling aperture members disposed in each of said rotor circular disc thermal conductor members in communication with adjacent cooling chamber regions
   radial coolant flow enabling and flow controlling aperture members disposed in said tubular shaped salient-poled stator member in spent coolant flow escape communication with said rotor member axially adjacent cylindrical segment cooling chamber regions.

2. The dynamoelectric machine of claim 1 further including an electrical energy switching circuit responsive to rotor to stator pole alignments within said machine.

3. The dynamoelectric machine of claim 1 wherein said rotor poles and said stator poles have one of the configurations of:
   said rotor poles are four in number and said stator poles are six in number; and
   said rotor poles are eight in number and said stator poles are twelve in number.

4. The dynamoelectric machine of claim 1 wherein said radial coolant flow-enabling and flow controlling stator aperture members are each located within one of:
   a structural portion of said stator salient poles; and
   a interpole region of said salient-poled stator member.

5. The dynamoelectric machine of claim 1 wherein said circular disc thermal conductor members are of the same diameter as an outer periphery portion of said rotor salient poles and are comprised of a thermally conductive nonmagnetic material.

6. The dynamoelectric machine of claim 5 wherein said circular disc thermal conductor members are comprised of one of the materials of beryllium, copper, aluminum, titanium, bronze, and brass.

7. The dynamoelectric machine of claim 1 wherein said axial coolant flow enabling and controlling aperture members disposed in said rotor circular disc thermal conductor members are of common total aperture area in each said pie shaped chamber area of a single disc and of a differing cross-sectional area in each said cooling chamber area of successive disc along said rotor axis.

8. The dynamoelectric machine of claim 7 wherein said differing cross-sectional area in each said cooling chamber area of successive discs along said rotor axis and said radial coolant flow enabling and controlling aperture members disposed in said tubular shaped salient-poled stator member are sized to maintain a selected operating temperature profile in said rotor member during a selected dynamoelectric machine operating condition.

9. The dynamoelectric machine of claim 1 wherein each said rotor and stator members are comprised of stacked laminations of magnetic material and said circular disc thermal conductor members ate between eight-thousandths (0.008) of an inch and two-hundred-thousandths (0.008–0.020) of an inch in thickness.

10. The method of optimizing a tradeoff between viscous cooling fluid losses and desired cooling effect in a high speed dynamoelectric machine of the salient pole reluctance type, said method comprising the steps of:
   interrupting a machine-induced flow of said viscous cooling fluid from end regions said reluctance dynamoelectric machine into a stator-surrounded axially extending rotor element space of said machine by disposing rotor carried, radially extending, disc-like, rotor end-shielding fluid flow barrier elements adjacent opposed ends of said rotor;
   interspersing additional of said rotor carried, radially extending, disc like, fluid-flow barrier elements between selected lengths of stacked laminations along said axially extending rotor element of said machine;
   providing axial fluid-flow-limiting apertures of selected size and viscous cooling fluid-flow capacity in said fluid flow barrier members in annular interpole spaces between said rotor salient poles;
   locating a plurality of stator-internal to stator-external fluid-communicating apertures at selected axial and radial locations along said stator; and
   adjusting size and fluid flow capacities of said flow apertures in each of said radially extending rotor carried, radially extending, disc like fluid flow barrier elements in response to maintaining a selected safe operating temperature profile for said rotor and stator elements under a selected representative set of machine operating conditions.

11. The method of claim 10 wherein said viscous fluid is a gas.

12. The method of claim 10 wherein said viscous fluid is ambient air.

13. The method of claim 10 wherein:
   said rotor carried radially extending fluid flow barrier elements are comprised of a thermally conductive nonmagnetic metal material; and
   said rotor carried radially extending disc like fluid flow barrier elements are of sufficient thickness and cross sectional area of said metal material as to also conduct a substantial thermal energy flow from interior regions of said salient poles and said rotor into said annular interpole spaces between salient poles for dissipation into said fluid flow.

14. The method of claim 10 wherein said selected representative set of machine operating conditions comprise worst case operating load, revolution rate, and operating cycle conditions.

15. The method of claim 10 wherein said plurality of stator-internal to stator-external fluid-communicating apertures include an aperture communicating with each rotor axial space defined by said selected lengths of stacked rotor laminations and said interspersed radially extending disc like fluid-flow barrier elements.

16. The method of claim 10 wherein said high speed dynamoelectric machine is a switched reluctance motor/generator.

17. The method of claim 16 wherein said switched reluctance motor/generator is an integral starter/generator for an aircraft hot gas turbine engine.

18. The method of claim 17 wherein said aircraft hot gas turbine engine is one of an aircraft propulsion engine and an aircraft auxiliary power unit.

19. The method of claim 17 wherein said step of adjusting size and fluid flow capacities of said flow apertures further includes adjusting size and fluid flow capacities of said plurality of stator-internal to stator-external fluid-communicating apertures to maintain a selected safe operating temperature profile for said rotor and stator elements.

20. Reluctance motor/generator apparatus comprising the combination of:

- a motor/generator torque-communicating rotatable shaft member disposed along a central axis of a motor/generator stator member;
- a salient pole magnetically conductive rotor member extending lengthwise along said torque-communicating rotatable shaft member within said stator member and rigidly connecting with said rotatable shaft member in a rotor centrodial region;
- said rotor member having a first substantially circular periphery of a first diameter around an outer extremity of said salient poles and a second periphery of a second smaller diameter in annular segment interpole regions located intermediate said salient poles;
- said rotor member being comprised of a plurality of electromagnetic loss-minimizing thin rotor lamination members held captive on said rotatable shaft member;
- said rotor member including a plurality of rotor temperature-controlling thermal elements of substantially said first diameter circular periphery configuration and selected thickness, disposed at opposed rotor ends and intermediate adjacent rotor laminations at selected axial space intervals along said rotor and said rotatable shaft member;
- said intermediate rotor temperature-controlling thermal elements having exposed annular segment interpole regions located intermediate said rotor salient poles;
- said rotor temperature-controlling thermal elements also having coolant fluid axial flow-communicating apertures of selected cross-sectional area disposed in said exposed annular segment interpole regions thereof; and
- a plurality of coolant fluid escape apertures disposed along said stator member at axially selected locations intermediate said rotor temperature-controlling thermal elements.

* * * * *